(12) United States Patent
Rawlings

(10) Patent No.: US 7,858,905 B2
(45) Date of Patent: Dec. 28, 2010

(54) VEHICULAR MIRROR WITH HEATER CIRCUIT MODULE

(75) Inventor: Don S. Rawlings, Caledonia, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 392 days.

(21) Appl. No.: 11/779,047

(22) Filed: Jul. 17, 2007

(65) Prior Publication Data

US 2008/0011733 A1 Jan. 17, 2008

Related U.S. Application Data

(63) Continuation of application No. 10/711,349, filed on Sep. 13, 2004, now Pat. No. 7,244,912.

(60) Provisional application No. 60/481,360, filed on Sep. 11, 2003.

(51) Int. Cl.
*G02F 1/155* (2006.01)
*H05B 3/03* (2006.01)
*H05B 3/16* (2006.01)
*H05B 3/20* (2006.01)
*H05B 3/28* (2006.01)

(52) U.S. Cl. .................... 219/219; 219/202; 219/541; 359/265

(58) Field of Classification Search ............... None
See application file for complete search history.

(56) References Cited

U.S. PATENT DOCUMENTS

| 5,808,777 | A | 9/1998 | Lynam et al. |
| 6,247,823 | B1 | 6/2001 | Fuerst et al. |
| 6,312,135 | B1 * | 11/2001 | Polzer ....................... 359/872 |
| 6,426,485 | B1 | 7/2002 | Bulgajewski et al. |
| 6,650,457 | B2 | 11/2003 | Busscher et al. |
| 6,669,267 | B1 | 12/2003 | Lynam et al. |
| 6,969,101 | B2 | 11/2005 | Lynam et al. |
| 7,195,381 | B2 * | 3/2007 | Lynam et al. ............... 362/494 |
| 7,408,694 | B2 * | 8/2008 | Busscher et al. ............ 359/265 |
| 2002/0171954 | A1 * | 11/2002 | Bonardi et al. .............. 359/877 |

FOREIGN PATENT DOCUMENTS

GB 2250406 A 6/1992

* cited by examiner

*Primary Examiner*—Joseph M Pelham
(74) *Attorney, Agent, or Firm*—McGarry Bair PC

(57) ABSTRACT

A vehicular mirror system includes an exterior mirror assembly having a reflective element for providing a rearward view to an occupant of a vehicle and a power distributor for distributing power from a single electrical power connector to a plurality of functional elements associated with the reflective element. The power distributor has a plurality of electrical leads corresponding to each functional element of the plurality of functional elements; the plurality of functional elements includes at least two functional elements selected from the group consisting of a dimming device, a heater, and a turn signal. The power distributor has at least one power lead for operative connection of the power distributor to an onboard power supply of the vehicle.

21 Claims, 6 Drawing Sheets

US 7,858,905 B2

VEHICULAR MIRROR WITH HEATER CIRCUIT MODULE

CROSS-REFERENCE TO RELATED APPLICATIONS

This application is a continuation of U.S. application Ser. No. 10/711,349, filed Sep. 13, 2004, now U.S. Pat. No. 7,244, 912, issued Jul. 17, 2007, which claims the benefit of U.S. provisional application Ser. No. 60/481,360, filed Sep. 11, 2003, both of which are incorporated herein by reference in their entirety.

BACKGROUND OF THE INVENTION

1. Field of the Invention

The invention relates to a vehicular rearview mirror system. In one aspect, the invention relates to a modular heating and power supply panel for providing power to a rearview mirror system incorporating several powered functions.

2. Description of the Related Art

Externally-mounted rearview mirror assemblies are ubiquitous for contemporary motor vehicles. Such mirror assemblies have long been used to aid the driver in operating the vehicle, especially in improving the driver's rearward view. Contemporary rearview mirror assemblies increasingly incorporate enhanced functionality in addition to image reflection, such as turn signal indicators, automatic dimming capabilities, and heating/defogging elements.

The functional elements, e.g. turn signals and heating/defogging elements, incorporated into the mirror assembly are typically powered and controlled by the vehicle's power supply and control systems. This necessitates separate power and control feeds to each functional element, which typically comprise separate wire harnesses. As well, each functional element typically comprises a distinct structural component which must be assembled into the finished mirror assembly. Assembly of the various functional elements and their associated power and control feeds can thus be complicated, particularly as the number and complexity of the functional elements increases. It is frequently necessary to simultaneously assemble several components into the mirror assembly, while ensuring that the components are in the proper positional relationship, and that their power and control feeds are properly interconnected. Improper assembly of the components can result in a mirror assembly that does not perform properly. Difficulty with achieving proper assembly, and the frequency of defective assemblies, contribute to an increase in the cost of such mirror assemblies.

SUMMARY OF THE INVENTION

In one embodiment of the invention, a vehicular mirror system comprises an exterior mirror assembly including a reflective element for providing a rearward view to an occupant of the vehicle, a support member for supporting the reflective element, a heater pad for heating the reflective element, at least one indicator, which can comprise a turn signal indicator, and a power distributor for distributing power from a single electrical power connector to the electrochromic dimming element and to the heater pad and to the at least one indicator. The reflective element comprises an electrochromic dimming element and at least one dimming element contact for providing electric power to the electrochromic dimming element. The power distributor comprises a plurality of electrical leads corresponding to each of the electrochromic dimming element and the heater pad and the at least one indicator. Power is selectively provided to the electrochromic dimming element, the heater element, and the at least one indicator.

In another embodiment of the invention, a vehicular mirror system comprises an exterior mirror assembly including a reflective element for providing a rearward view to an occupant of the vehicle, a support member for supporting the reflective element, a heater pad for heating the reflective element, at least one indicator, and a power distributor for distributing power from a single electrical power connector to the electrochromic dimming element and to the heater pad and to the at least one indicator. The reflective element comprises an electrochromic dimming element and at least one dimming element contact for providing electric power to the electrochromic dimming element. The power distributor comprises a plurality of electrical leads corresponding to each of the electrochromic dimming element and the heater pad and the at least one indicator. Power is selectively provided to the electrochromic dimming element, the heater element, and the at least one indicator. The electrical power connector is adapted to be interconnected with an onboard power supply of the vehicle. The electrical power connector comprises a ribbon cable.

DESCRIPTION OF EMBODIMENTS OF THE INVENTION

Figure 1:
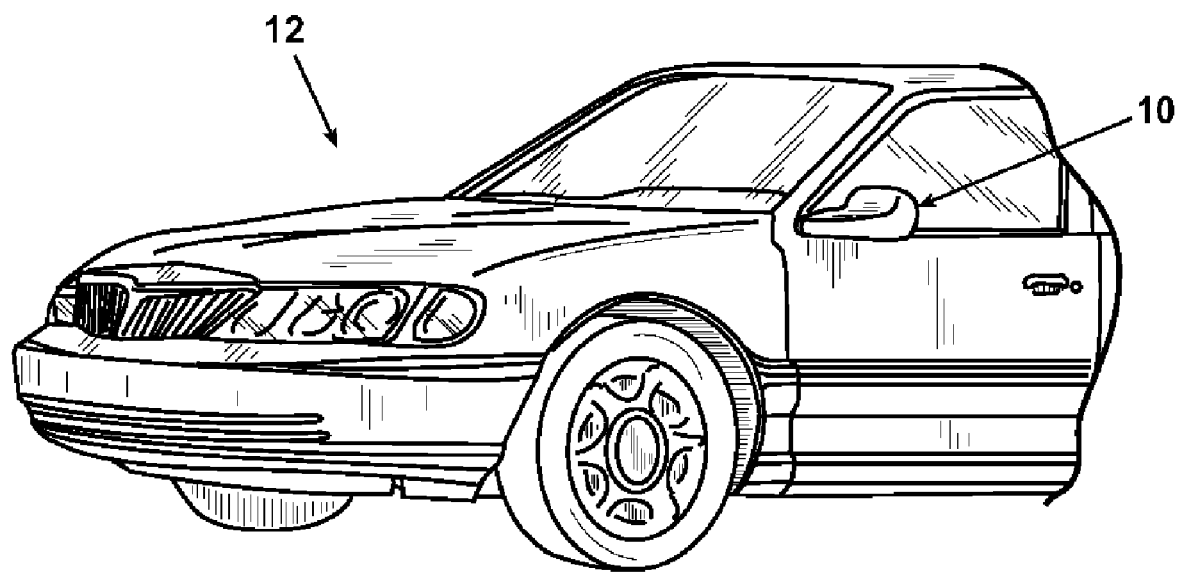
FIG. 1 is a partial perspective view of a vehicle having a rearview mirror system comprising a modular heater circuit according to the invention.
Figure 2:
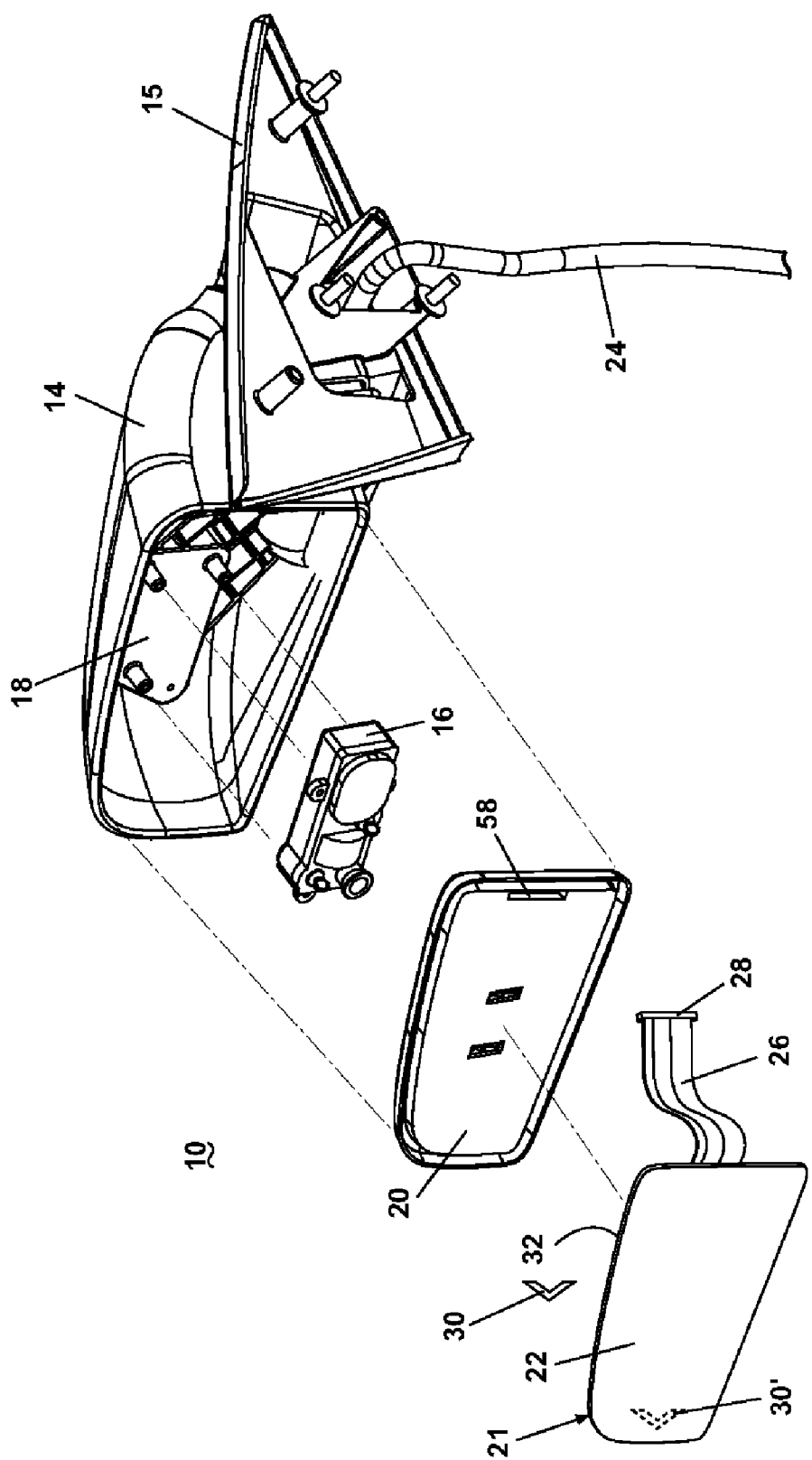
FIG. 2 is an exploded view of the rearview mirror system shown in FIG. 1 comprising a reflective element assembly and a mirror case.

Referring now to FIGS. 1 and 2, an external rearview mirror system 10 according to the invention is shown attached to a motor vehicle 12. In most respects, the external rearview mirror system 10 is similar to a conventional rearview mirror assembly, and comprises a shell 14 attached to a base 15 through which the rearview mirror system 10 is attached to the motor vehicle 12. The shell 14 encloses a tilt actuator assembly 16 mounted to a support frame 18, which is used to adjust the orientation of a reflective element carrier 20 about two perpendicular axes. The reflective element carrier 20 mounts a reflective element assembly 21. A wire harness 24 provides power and operational control from the vehicle power/control center to the rearview mirror system 10.

Figure 3:
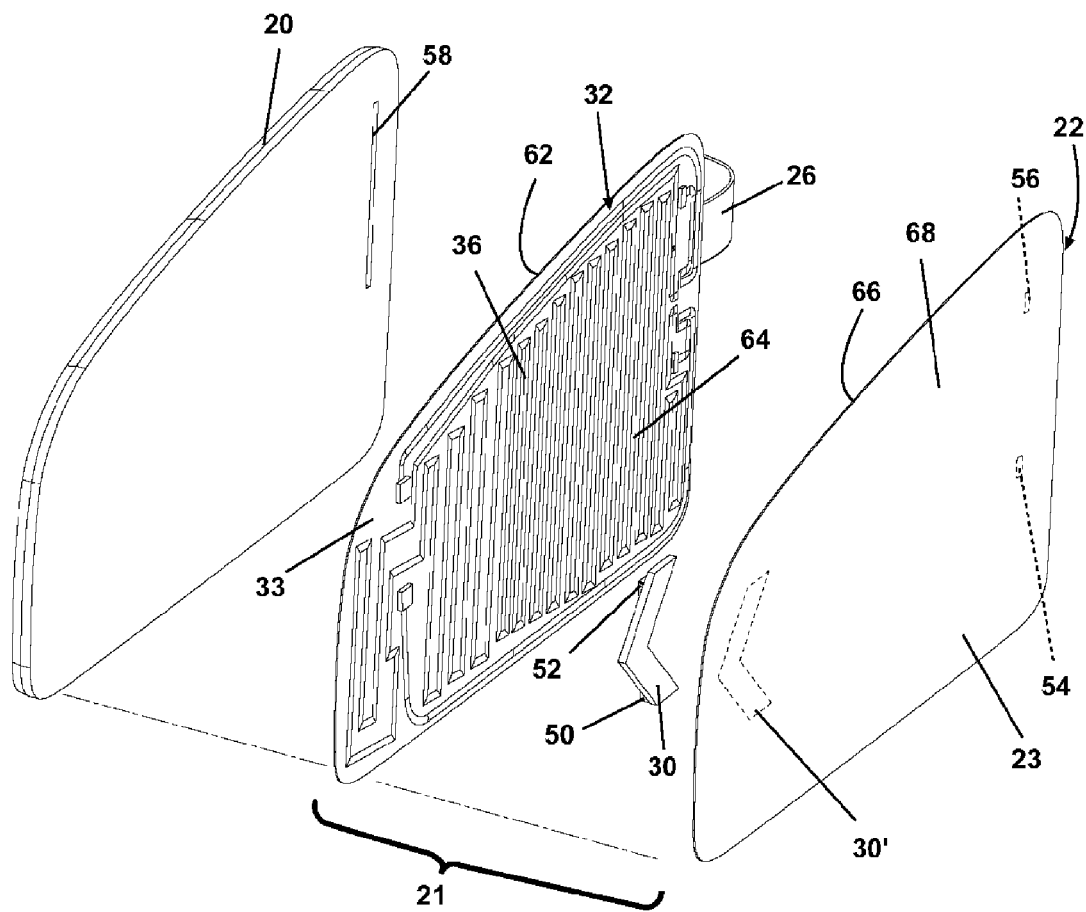
FIG. 3 is an exploded view of the reflective element assembly and mirror case shown in FIG. 2 comprising an integrated heater pad/power supply array.

Referring also to FIG. 3, the reflective element assembly 21 comprises a reflective element 22, and a power distributor 32 according to the invention, which is illustrated in exemplary form as an integrated heater pad and power supply array. The reflective element 22 comprises a plate-like support member 23 having a reverse face 66 and an obverse face 68. The reflective element 22 can comprise a generally conventional mirror comprising, for example, a coated glass or reflective polymer attached to the reverse face 66. The reverse face 66 of the reflective element 22 can also be positioned adjacent to a turn signal element 30 for turn signal indication, as hereinafter described.

As shown in the drawings the reflective element 22 can be provided with an optical region 30' through which light emitted from the turn signal element 30 can be displayed, typically to drivers located rearwardly of the vehicle on which the mirror system described herein is mounted. The optical region 30' can be any known light-transmitting region such as a transparent area, a translucent area, whether covered by a filter, optical mask and the like. It will also be understood that the optical region 30' can simply be an area on the reflective element 22 through which light from the turn signal element 30' emanates.

The turn signal element 30 is also provided with a turn signal power contact point 50 and a turn signal common contact point 52. The contact points 50, 52 are adapted for electrical connection with a positive terminal and a negative terminal of a power supply for activation of the turn signal element 30.

The reflective element 22 is provided with an electrochromic power contact point 54 and an electrochromic common contact point 56 attached to the reverse face 66 and adapted to energize an electrochromic mirror dimming feature incorporated into the reflective element 22.

The power distributor 32 comprising the integrated heater pad/power supply array comprises a planar support member 33 having a reverse face 62 and an obverse face 64. An array 36 of electrically-conductive tracings is carried on the obverse face 64 and comprises a plurality of discrete contact points for electrical connection of the array 36 with selected functional elements associated with the reflective element assembly 21, such as the turn signal element or the electrochromic mirror dimming element. Electrical power is provided to the power distributor 32 through a power supply harness 26 suitably interconnected with the support member 33. The power supply harness 26 preferably carries a single positive electrical power lead for electrical communication with a positive power portion of the array 36, and a single common power lead or grounded lead for electrical communication with a common portion of the array 36 in order to provide required power to the circuits comprising the selected functional elements, such as the turn signal element, the electrochromic mirror dimming element, and the heater element described herein.

As indicated previously herein, the power distributor 32 is illustrated as configured to incorporate a heater pad. However, other embodiments can be configured wherein the power distributor 32 does not include a heater pad (such as, for example, where the mirror system is not to be provided with a heater pad), and the power distribution is accomplished with the incorporation of a different functionality, such as electrochromic dimming, or a power distributor incorporating a pair of electrical contact bars only. Preferably, the power distributor 32 is configured for power distribution over a relatively large area of the support member 33 so that the electrical contact points along the power distributor 32 for the different functionalities are located at those functionalities and are not concentrated in a relatively limited area of the support member 33. A heater pad provides an effective integration of such a distributed power supply and functionality.

Figure 4:
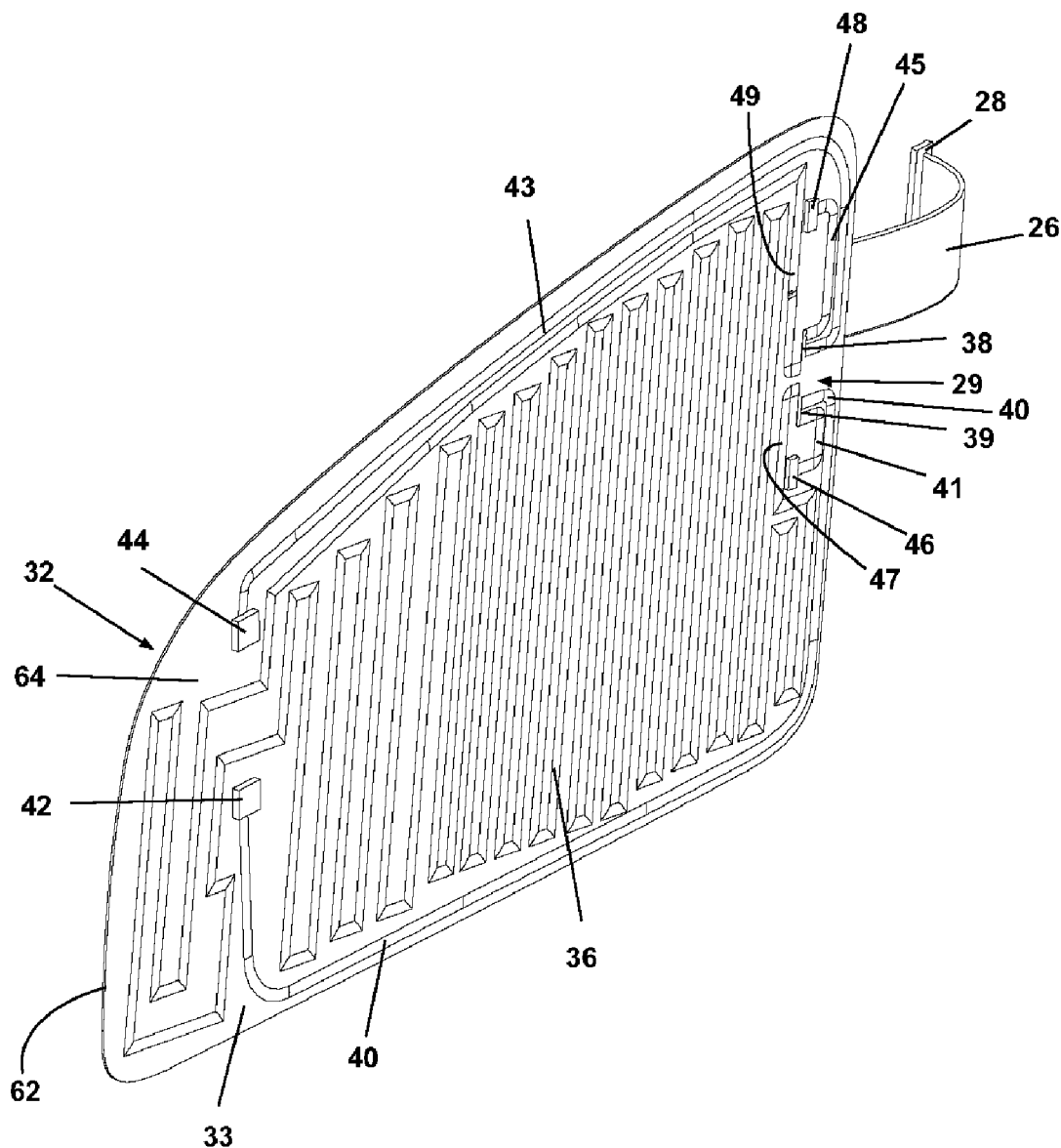
FIG. 4 is a close-up perspective view of the integrated heater pad/power supply array shown in FIG. 3.

As shown specifically in FIG. 4, the power distributor 32 comprises a power supply harness 26 extending from the reverse face 62 and operably connected in a generally well-known manner through the support member 33 to a module connection 29 on the obverse face 64. In addition to providing electrical power, the power supply harness 26 is adapted to provide operating control to the reflective element assembly 21. The power supply harness 26 terminates in a conventional plug connector 28 adapted for cooperative communication with the wire harness 24.

The module connection 29 is divided into a common lead 38 electrically connected to a turn signal common lead 43, an electrochromic common lead 45, and a heater common lead 49, and a power lead 39 electrically connected to a turn signal power lead 40, an electrochromic power lead 41, and a heater power lead 47. Electrically connected to the heater common lead 49 and the heater power lead 47 is a well-known heater tracing 36 incorporated into the obverse face 64 and adapted for defrosting and defogging the reflective element 22 when the integrated heater pad/power supply array 32 and the reflective element 22 are brought into operable communication.

The turn signal common lead 43 feeds a turn signal tracing 43 which terminates in a turn signal common contact 44, and an electrochromic common lead 45 terminates in an electrochromic common contact 48. Similarly, the turn signal power lead 40 feeds a turn signal power tracing 40 which terminates in a turn signal power contact 42. An electrochromic power lead 41 terminates in an electrochromic power contact 46.

The turn signal common contact 44 is adapted for electrical communication with the turn signal common contact point 52, and the turn signal power contact 42 is adapted for electrical communication with the turn signal power contact point 50. The electrochromic common contact 48 is adapted for electrical communication with the electrochromic common contact point 56, and the electrochromic power contact 46 is adapted for electrical communication with the electrochromic power contact point 54.

When the power distributor 32 is brought into aligned contact with the reflective element 22, the electrochromic common contact 48 will be brought into electrical communication with the electrochromic common contact point 56, and the electrochromic power contact 46 will be brought into electrical communication with the electrochromic power contact point 54, thereby providing power to the electrochromic mirror dimming element.

Similarly, the turn signal common contact 44 will be brought into electrical communication with the turn signal common contact point 52, and the turn signal power contact 42 will be brought into electrical communication with the turn signal power contact point 50, thereby providing electrical power to the turn signal element 30. Of course, the turn signal element 30 is brought into alignment with the optical region 30' on the reflective element during the mounting of these components to one another as well.

Figure 5:
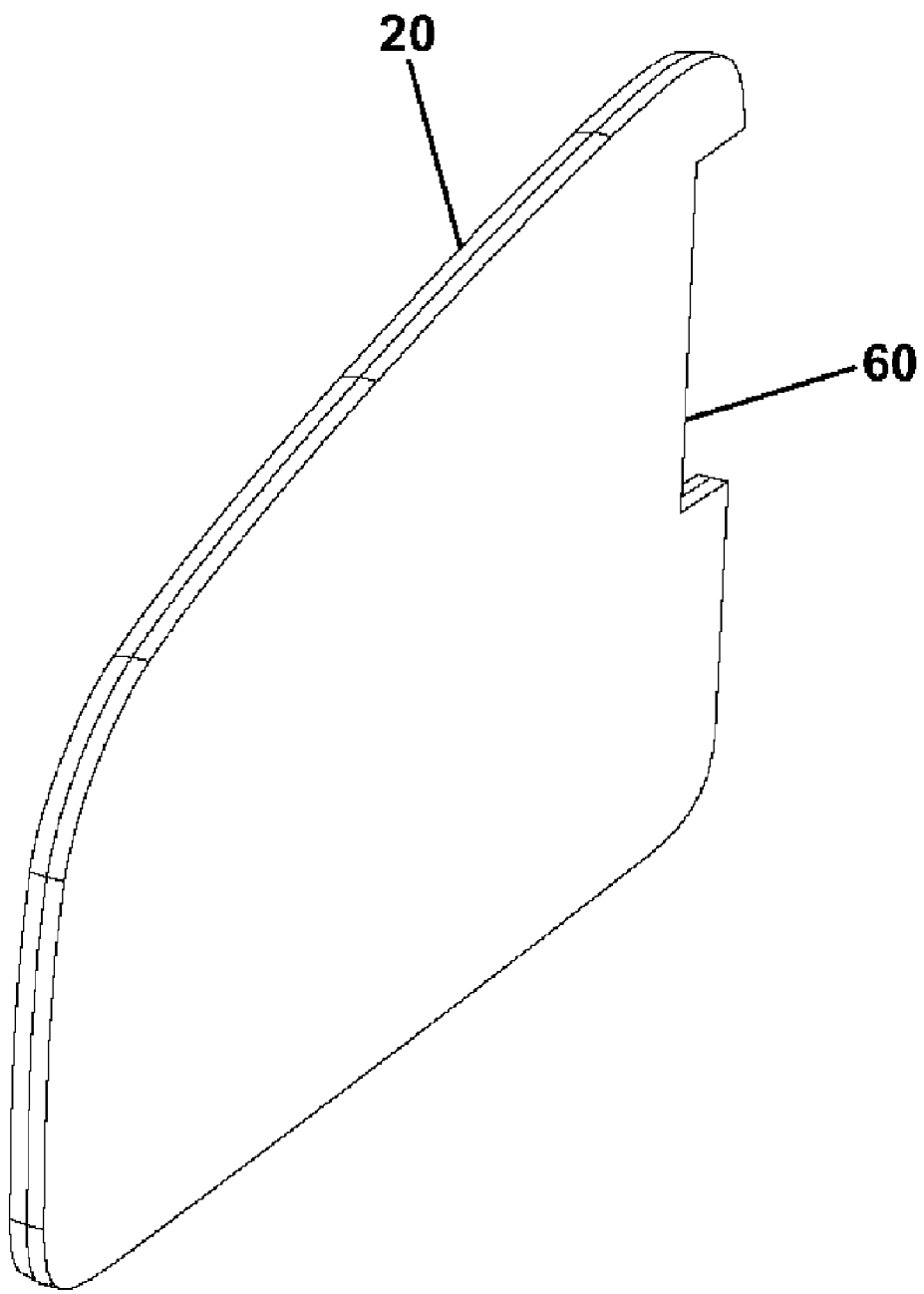
FIG. 5 is a perspective view of an alternate embodiment of the mirror case shown in FIG. 2.

The reflective element carrier 20 comprises a generally conventional reflective element carrier adapted to mount the reflective element assembly 21, provided with a power supply harness slot 58 aligned for mating cooperation with the power supply harness 26 so that, when the reflective element assembly 21 is mounted to the reflective element carrier 20, the power supply harness 26 can be inserted through the power supply harness slot 58 to be connected to the wire harness 24. As shown in FIG. 5, the reflective element carrier 20 can alternatively be provided with a power supply harness notch 60 rather than the power supply harness slot 58 to facilitate the connection of the power supply harness 26 through the reflective element carrier 20 to the wire harness 24.

Figure 6:
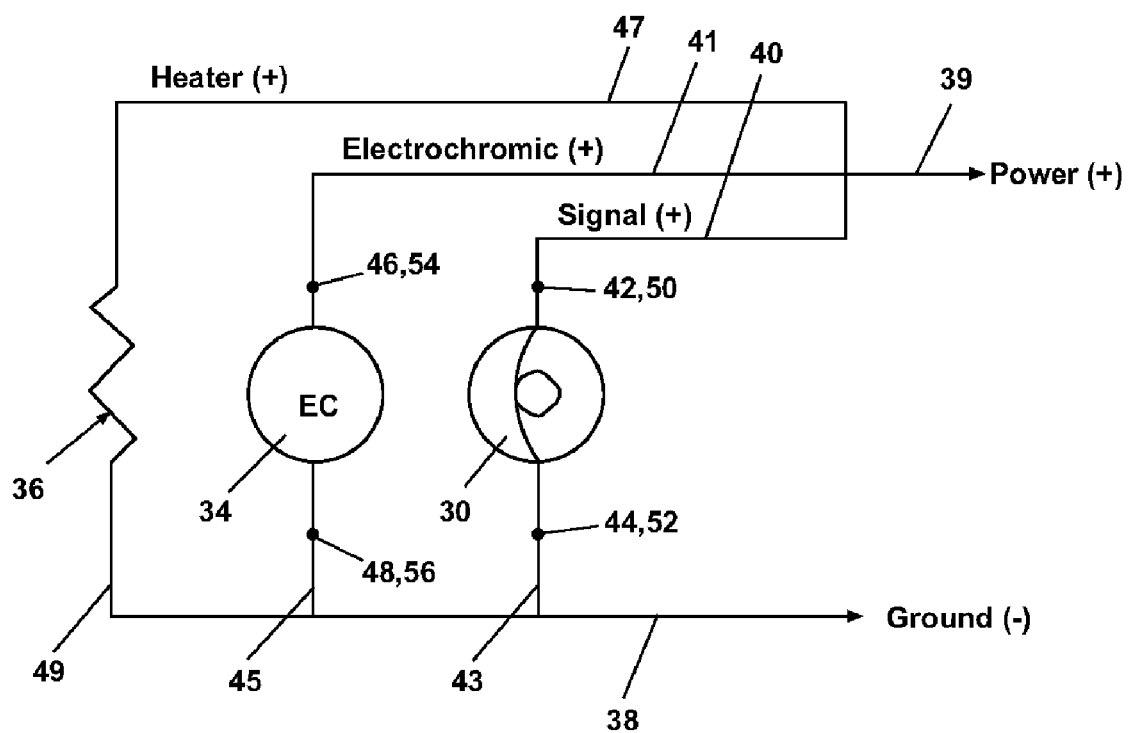
FIG. 6 is a schematic diagram of an electrical circuit for the rearview mirror system shown in FIG. 1.

FIG. 6 shows a schematic wiring diagram for the rearview mirror system 10 described herein. As shown in FIG. 6, the turn signal element 30, the electrochromic module 34, and the heater tracing 36 are each supplied by separate power leads 40, 41, 47 respectively, connected to a single power lead 39, and are all connected to a common or ground lead 38 through their respective common leads 43, 45, 49. The common and power contacts 42, 44, 46, 48, 50, 52, 54 and 56 are shown in FIG. 6 as well. As can be seen in FIG. 6, the mating sets of contact points that are brought into alignment during assembly of the vehicular mirror described herein are shown as matched pairs in FIG. 6: (42, 50) and (44, 52) for the turn signal element 30, and (46, 54) and (48, 56) for the electrochromic element 34. Since the heater element 36 has tracings which directly connect to the appropriate circuit components, no contact points are shown although contact points can be provided to the heater element 36 without departing from the scope of this invention.

The improved reflective element assembly described herein facilitates the assembly of the rearview mirror system by eliminating the multiple wire harnesses and plug-type connectors necessitated by the prior art assemblies to accommodate each functional element incorporated into the rearview mirror system. The heater pad, electrochromic dimming element, turn signal element, and other functional elements in the rearview mirror system can be readily integrated and interconnected with the primary wire harness to the rearview mirror system through a single plug connection which can be readily installed during assembly of the rearview mirror. The improved assembly will provide cost savings in reduced assembly time, and reduced misassembly of the complex prior art mirror system.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. A vehicular mirror system comprising:
   a reflective element assembly including a reflective element for providing a rearward view to an occupant of a vehicle, and a power distributor associated with said reflective element;
   at least one of an electrochromic dimming element and a turn signal indicator;
   said power distributor characterized by an array of electrically-conductive tracings incorporated into a planar reflective element support member and coincident with said reflective element, said electrically-conductive tracings including a singular module connection and at least one pair of contact points for distributing electric power to at least one of an electrochromic dimming element and a turn signal indicator; and
   a singular power supply connector, said singular power supply connector and said singular module connection coupled to define a singular power supply assembly for providing electric power from a remote power supply to said electrically-conductive tracings and said at least one of an electrochromic dimming element and a turn signal indicator;
   wherein said at least one of an electrochromic dimming element and a turn signal indicator can be selectively coupled with said power distributor by aligning said at least one of an electrochromic dimming element and a turn signal indicator for electrical contact with said at least one pair of contact points; and
   wherein electric power can be selectively provided to said array of electrically conductive tracings for both powering said array and powering said at least one of an electrochromic dimming element and a turn signal indicator through said singular power supply assembly.

2. A vehicular mirror system in accordance with claim 1, wherein said singular power supply connector is interconnected with an onboard power supply of said vehicle.

3. A vehicular mirror system in accordance with claim 2, wherein said singular power supply connector includes a ribbon cable.

4. A vehicular mirror system in accordance with claim 1, wherein said array of electrically-conductive tracings abuts said reflective element.

5. A vehicular mirror system in accordance with claim 1, wherein said power distributor includes a planar member having a periphery in register with said periphery of said reflective element.

6. A vehicular mirror system in accordance with claim 1, wherein said array of electrically-conductive tracings conforms to an effective imaging area of said reflective element, and wherein said array of electrically-conductive tracings is operatively connected to a first one of a plurality of electrical leads.

7. A vehicular mirror system comprising:
   a reflective element assembly, including a reflective element having a selected perimetric configuration, and a planar electric power distributor coincident with said reflective element;
   at least one of an electrochromic dimming element and a turn signal indicator;
   said power distributor characterized by electrically-conductive tracings distributed as a planar array of heating elements coincident with said selected perimetric configuration; and
   said electrically-conductive tracings including at least one pair of contact points associated with at least one of an electrochromic dimming element and a turn signal indicator for distributing electric power to at least one of an electrochromic dimming element and a turn signal indicator;
   wherein said power distributor can concurrently heat said reflective element and distribute power to said at least one of an electrochromic dimming element and a turn signal indicator from a singular power supply assembly characterized by a singular power supply connector and a singular module connection.

8. A vehicular mirror system in accordance with claim 7, wherein said singular power supply connector is interconnected with an onboard power supply of said vehicle.

9. A vehicular mirror system in accordance with claim 8, wherein said singular power supply connector includes a ribbon cable.

10. A vehicular mirror system in accordance with claim 7, wherein said at least one of an electrochromic dimming element and a turn signal indicator abuts said reflective element.

11. A vehicular mirror system in accordance with claim 7, wherein said array of electrically-conductive tracings conforms to an effective imaging area of said reflective element, and wherein said array of electrically-conductive tracings is operatively connected to a first one of a plurality of electrical leads.

12. A vehicle mirror system comprising:
   a reflective element support member supporting a reflective element;
   a generally planar power distributor support member supporting a power distributor including an array of electrically-conductive tracings incorporated into said planar reflective element support member; and a generally planar reflective element carrier supporting said reflective element support member and said power distributor support member in stratified disposition;

said power distributor including first electric circuitry, second electric circuitry, and third electric circuitry, said first circuitry, second circuitry, and third circuitry can include contact points for selectively providing electric power to first, second, and third functional elements, respectively; a power supply for coupling with said power distributor to provide electric power thereto;

a power supply harness coupled with said power supply and terminating in a singular power supply connector;

a singular module connection associated with said power distributor for coupling with said singular power supply connector for providing electric power to said first circuitry, said second circuitry, and said third circuitry;

said first circuitry extending continuously from said singular module connection;

said second circuitry extending continuously from said singular module connection to said second contact points; and said third circuitry extending continuously from said singular module connection to said third contact points;

wherein when said power distributor support member is interlaid with said reflective element support member and said reflective element carrier, said second functional element is placed in electrical contact with said power distributor, and said third functional element is placed in electrical contact with said power distributor.

13. A vehicular mirror system in accordance with claim 12, wherein said second functional element includes one of an electrochromic dimming element and a turn signal indicator.

14. A vehicular mirror system in accordance with claim 13, wherein said turn signal indicator abuts said reflective element.

15. A vehicular mirror system in accordance with claim 13, wherein said second functional element includes a turn signal indicator.

16. A vehicular mirror system in accordance with claim 15, wherein said turn signal indicator abuts said reflective element.

17. A vehicular mirror system in accordance with claim 15, wherein said first functional element includes said array of electrically conductive tracings.

18. A vehicular mirror system in accordance with claim 12, wherein said power distributor includes a planar member having a periphery in register with a periphery of said reflective element.

19. A vehicular mirror system in accordance with claim 12, wherein said array of electrically-conductive tracings conforms to an effective imaging area of said reflective element, and wherein said array of electrically-conductive tracings is operatively connected to a first one of a plurality of electrical leads.

20. A vehicle mirror system comprising:
 a reflective element;
 a power distributor including an array of electrically-conductive tracings associated with said reflective element; and
 a reflective element carrier supporting said reflective element and said power distributor in stratified disposition;
 said power distributor including first electric circuitry, second electric circuitry, and third electric circuitry, said first, second, and third circuitry can include contact points for selectively providing electric power to first, second, and third functional elements, respectively;
 a power supply for coupling with said power distributor to provide electric power thereto;
 a power supply harness coupled with said power supply and terminating in a singular power supply connector;
 a singular module connection associated with said power distributor for coupling with said singular power supply connector for providing electric power to said first, second, and third circuitry through a singular electrical connection;
 said first circuitry and said singular module connection can define a first continuous circuit;
 said second circuitry extends from said singular module connection to said second contact points, and said second circuitry, said singular module connection, said second contact points, and said second functional element, can define a second continuous circuit independent of said first continuous circuit; and
 said third circuitry extends from said singular module connection to said third contact points, and said third circuitry, said singular module connection, said third contact points, and said third functional element, can define a third continuous circuit independent of said first and second continuous circuits;
 wherein coupling of said singular power supply connector with said singular module connection defines a singular electrical coupling for distributing electric power throughout said power distributor for energizing said first continuous circuit, for providing electric power for energizing said second continuous circuit, and for providing electric power for energizing said third continuous circuit.

21. A vehicular mirror system in accordance with claim 20, wherein said power distributor includes a planar member having a periphery in register with a periphery of said reflective element.

* * * * *